United States Patent [19]

Majic

[11] Patent Number: 4,787,136

[45] Date of Patent: Nov. 29, 1988

[54] CONTROL AND MONITORING ARRANGEMENT FOR TOOLS

[75] Inventor: Milivoj Majic, Urbach, Fed. Rep. of Germany

[73] Assignee: Stabil Elektronik GmbH, Esslingen, Fed. Rep. of Germany

[21] Appl. No.: 32,218

[22] Filed: Mar. 31, 1987

[30] Foreign Application Priority Data

Nov. 3, 1986 [DE] Fed. Rep. of Germany ....... 3637236

[51] Int. Cl.$^4$ .......................................... B23Q 15/00
[52] U.S. Cl. ...................................... 29/709; 29/703; 29/720
[58] Field of Search ................ 29/701, 702, 703, 704, 29/710, 720, 714, 721; 91/46, 47

[56] References Cited

U.S. PATENT DOCUMENTS

4,520,446 5/1985 Sato ................................ 29/709 X
4,553,077 11/1985 Brantmark et al. ............ 901/46 X

FOREIGN PATENT DOCUMENTS

2707161 9/1977 Fed. Rep. of Germany .
211437 12/1982 Japan ................................... 29/709
211438 12/1982 Japan ................................... 29/709

Primary Examiner—P. W. Echols
Assistant Examiner—Andrew E. Rawlins
Attorney, Agent, or Firm—Sughrue, Mion, Zinn, Macpeak, and Seas

[57] ABSTRACT

A control and monitoring arrangement for "intelligent" tools is disclosed each of which is preset with a reference value for at least one assembly parameter for each assembly operation by a control unit, and each of which signals the actual value measured by means of incorporated sensors in respect of said assembly parameter to the control unit which compares that measured value to the reference value. In the control unit a plurality of reference values and/or tolerance limits in respect of difference assembly tasks is stored. Each of the tools can be used without particular operating steps, in a freely selectible sequence, for different assembly tasks at different assembly locations. The arrangement has a recognition means which, for each assembly location at which an assembly task is to be carried out, generates a recognition signal for identifying the assembly location and/or the tool, when the tool moves into the area of the assembly location, the recognition signal being transmitted to the control unit and there serving to select the at least one reference value which is desired for the respective assembly task in question and/or the associated tolerance limits.

7 Claims, 2 Drawing Sheets

CONTROL AND MONITORING ARRANGEMENT FOR TOOLS

FIELD OF THE INVENTION

The invention concerns a control and monitoring arrangement for a tool.

BACKGROUND OF THE INVENTION

Industrial mass production involves the pereformance of a large number of constantly repetitive assembly operations, for example tightening screws or nuts, by means of manual or motor-driven tools, in which respect an important consideration is that certain assembly parameters, for example the torque and/or the angle of rotation with or through which a screw or nut is tightened, coincide with predetermined reference values, within tolerance limits which are also predeterminable.

In the description of the present invention as set out hereinafter, consideraton is given only to assembly operations which are identical in regard to the purely external procedure involved, that is to say, which can always be carried out with one and the same kind of tool; however those assembly operations are referred to as being different from each other when the reference values in respect of one or more of the relevant assembly parameters and/or the tolerance limits within which those reference values have to be attained are different from each other. If for example one screw is to be tightened with a torque of 1 mkg±10%, another screw is to be tightened with a torque of 1.5 mkg±10% and a third screw is to be tightened with a torque of 1.5 mkg±5%, then in the present context those situations involve three assembly operations which are different from each other, although they can be carried out with one and the same screw driving tool.

Tools which are referred to as 'intelligent' tools are known, which on the one hand can be controlled to produce a presettable reference value in respect of at least one assembly parameter, wherein said presettable reference value can be a different one for each individual assembly operation, and which on the other hand include sensors for detecting the actual value which is actually attained, in respect of the at least one assembly parameter, and for converting that actual value into a corresponding actual value signal. Thus for example an 'intelligent' screw driver or nut wrench or key may be of such a design that it automatically terminates the operation of tightening the screw or the nut respectively, when a predeterminable reference torque value is achieved. In that connection the value or the magnitude of the reference torque is variable and is preset from a control unit to which the tool is connected by means of a cable or by a wireless connecting means. After each assembly operation has been carried out, the actual value as detected by the sensors is transmitted to the control unit which checks whether it coincides with the preset reference value, within the associated tolerance limits which can also be preset. If the reference value and the actual value coincide within the tolerance limits, the assembly operation is deemed to be 'good' and the workpiece is released for the next assembly operation or assembly step. If one of the reference values is not attained within the preset tolerance limits, the workpiece is generally removed from the production line and passed to an adjustment station.

It is quite possible for an 'intelligent' tool of the above-indicated kind to be used to carry out in succession a multiplicity of different assembly operations, that is to say assembly operations in regard to which, in the most extreme situation, different reference values and/or different tolerance limits are preset on each occasion in respect of one or more assembly parameters. It will be appreciated that a necessary condition in that respect is that the various assembly operations are always carried out in the same sequence, once it has been preset, as the control unit calls up the reference values and/or tolerance limits for each assembly operation, in accordance with a set program. The operator of such a tool must know and precisely observe the sequence which is set down by the program, because otherwise assembly errors occur, which moreover cannot be recognised by the control unit as the control unit does not in fact have any information showing that the wrong reference value was preset. In such a situation, the control unit would only find that the actual values attained were coincident with the preset reference values within the preset tolerance limits, and would incorrectly identify as 'good', the assembly operation or operations in question.

It frequently happens that a production line involves the use of a number of identical or similar tools which however have to carry out assembly operations which are generally different in the above-indicated sense. If the control units of those 'intelligent' tools are combined together to form a central control station, that central control station must generally preset different reference values for the various tools and must compare the actual values supplied by the various tools with the respectively correct reference values and/or monitor the attainment of different tolerance limits. As long as each of the tools is always used for the same assembly operation or for the same sequence of assembly operations, as is conventional practice in accordance wtih the state of the art, no problems arise in that connection because a predeterminable reference value or set of reference values and predetermined tolerance limits or a predeterminable sequence of such reference values and tolerance limits can be associated with each tool in a clear and uniform manner. Irrespective of whether a plurality of control units are combined together to provide a central control station or whether each tool is connected or equipped with its own individual control unit, in such a control and monitoring arrangement which is in accordance with the state of the art, a tool can only ever be used for one and the same assembly operation or one and the same sequence of assembly operations, which sequence must be precisely observed, if the operator is not to be in a position of constantly changing the reference value or values and/or the tolerance limits in respect of the assembly parameters, which is something that cannot be done in the practical situation of industrial mass production.

On the other hand however it is desirable to be able to use one and the same 'intelligent' tool for various assembly operations in any desired sequence; that is necessary for example in regard to adjustment operations on the workpieces which are removed from the production line at various locations for the reason that the actual values of the respective assembly operation do not coincide with the applicable reference values, within the associated tolerance limits. Hitherto only simple tools which do not permit monitoring of the assembly parameters produced therewith have been used for such constantly varying adjustment assembly operations.

In comparison with that art, it is an objective of the present invention to provide a control and monitoring arrangement for tools which makes possible to carry out various assembly operations in any sequence by means of an 'intelligent' tool, without the operator being required in that connection to make any alterations at the monitoring system or to introduce fresh data.

SUMMARY OF THE INVENTION

In practizing the invention it is made possible for an operator to operate with one and the same tool in any sequence at various assembly locations at which assembly operations which are respectively different from each other have to be carried out, wherein the same assembly operation is always repeated at one and the same assembly location. The reference value or values and the tolerance limits in respect of the assembly parameter or parmeters of an assembly operation are linked to the assembly location at which the respective assembly operation is to be carried out. As all reference values and tolerance limits involved are stored in the control unit, it is sufficient that, when the operator moves the tool into the spatial area of an assembly location, the recognition means generates a recognition signal and passes it to the control unit which forms a unique association between the tool and the operating assembly location, that is to say the assembly location at which the tool is to be operated at that time. On the basis of the recognition signal, the control unit can then select the reference value or values and tolerance limits which are to be applied at that time in respect of the assembly operation being performed, it can preset the correct reference value or values for the tool prior to the commencement of the assembly operation and, after the assembly operation has been performed, it can refer to the reference value or values and the tolerance limits, for the purposes of evaluating the actual values supplied by the tool.

In accordance with the invention, that principle can also be used when the control units of a plurality of tools are combined together to provide a central control station. The only important consideration is that the recognition signal always makes it possible to form a unique association between the operating assembly location for which the required reference values and tolerance limits must be provided) and the tool used at that location (the tool is the means supplying the actual values).

A preferred embodiment in respect of a recognition means which can be used in a control and monitoring arrangement according to the invention provides that for each assembly location there is a transmitter which emits a signal identifying the assembly location and distinguishing it from other assembly locations, in such a way that said signal is received by the receiver disposed at the tool only when the tool, in order to carry out the assembly operation in question, is moved into the direct vicinity of the assembly location where the receiver necessarily becomes immersed in the 'shower of information' which is irradiated from the transmitter. In that way the tool firstly has information as to the assembly location at which it is being used at that time. That information is passed to the control unit or central control station which can then use the relevant reference value or values and tolerance limits for the purposes of actuation of the tool and for the purposes of comparison with the actual values supplied by the tool in question.

If a plurality of tools are put to variable use, each of which, by way of its own transmission channel, for example a connecting conduit, both receives the presetting reference value or values and also transmits the recognition signal and the actual values to the central control station, then the required association of the control signals for the tools and the recognition signals which include the information relating to the respective operating assembly location involved at that time, and the tool which requires reference value presetting and supplies the measured actual values is already ensured by that separate transmission channel. Another option is that of also adding to the recognition signal which identifies the operating assembly location, an information signal which distinguishes the tool which transmits that recognition signal to the central control station, from all other tools.

Another possible way of embodying a recognition means which is to be used in accordance with the invention provides that each assembly location has a sensor which, when it registers that a tool has moved into the direct area around the assembly location, generates a corresponding recognition signal. In that connection it is not absolutely necessary for the tool to carry an active transmitter. Instead, for example, it is possible for the approach of the tool to an assembly location to modify a field generated by a sensor in that area, in such a way that the modification in that field can be uniquely detected by the sensor. In such situations, the recognition signal respectively generated by the sensor is also passed to the control unit, whereby for example the use of transmission channels which are separate from each other makes it possible to form the association between the respective operating assembly location and the tool. If a plurality of tools are used, which are monitored by a common central control station, clear identification of the respective tool to be used at an assembly location is also necessary in that situation, and that can be achieved for example by each tool carrying its own transmitter with closely restricted range, which emits a signal which can be received only by the receiver of the respective assembly location and which distinguishes the respectively associated tool from all other tools.

In general, provided at or in a production line are a multiplicity of assembly stations at which the workpiece on which the assembly operations are to be carried out respectively stops for a given period of time in a defined position, in order then to be conveyed on to the next assembly station. As long as the workpiece is disposed in an assembly station, it is possible to provide that the same or different assembly tasks can always be carried out at one or more assembly locations, that is to say at one or more locations on the workpiece itself. If, in an assembly station, an assembly task is to be carried out only at one assembly location on the workpiece or if the same assembly task is always to be carried out at a plurality of assembly locations, then in accordance with the invention it is sufficient always to form a clear association between the tool which can be used in any sequence at various assembly stations, and the respective operating assembly station. In such a case the term 'assembly station' may be used instead of the term 'assembly location' in the claims and the description preceding same. In the preferred situation where the recognition means includes a transmitter for identifying the assembly location and a receiver disposed at the tool, that means that disposed at each assembly station is a respective transmitter which transmits a signal which is restricted to the area around the assembly station. Then, in the region of an assembly station identified in that way, either only a single kind of assembly tasks can be carried out, possibly at a plurality of assembly locations, or a plurality of different assembly tasks can be carried out, in a precisely predetermined sequence. That situation only permits the tool to be freely changed from one assembly station to another in any sequence.

In comparison therewith however the arrangement according to the invention may also be such that a plurality of assembly tasks which are different from each other can be performed in any sequence at a single assembly station, in other words, various assembly operations can be carried out involving different reference values and/or tolerance limits at various assembly locations, without being bound to a predetermined program. In the situation where the recognition means includes a transmitter for identifying the respective assembly location and a receiver which is disposed at the tool, that means for example that provided at an assembly station are a plurality of transmitters, each of which emits a signal into a precisely defined spatial area. In that case also a transmitter may cover the spatial area of a plurality of assembly locations on the workpiece, being however assembly locations at which the same assembly task has to be carried out, or at which different assembly tasks have to be carried out in a fixedly predetermined sequence. Preferably the signal emitted by the transmitter is a carrier signal onto which a signal identifying the assembly location is modulated, on the output side of the receiver a demodulator being provided for producing the recognition signal. The carrier signal advantageously may be an infrared or an ultra-sonic signal.

Advantageous developments of the control and monitoring arrangement according to the invention are set forth in the subsidiary claims.

BRIEF DESCRIPTION OF THE DRAWING

The invention is described in the following in greater detail by means of an embodiment with reference to the drawings in which there show FIG. 1 a diagrammatic view of a control and monitoring arrangement according to the invention, and FIG. 2 a schematised block circuit diagram of the control unit used in the control and monitoring arrangement shown in FIG. 1.

DESCRIPTION OF PREFERRED
EMBODIMENTS OF THE INVENTION

Figure 1:
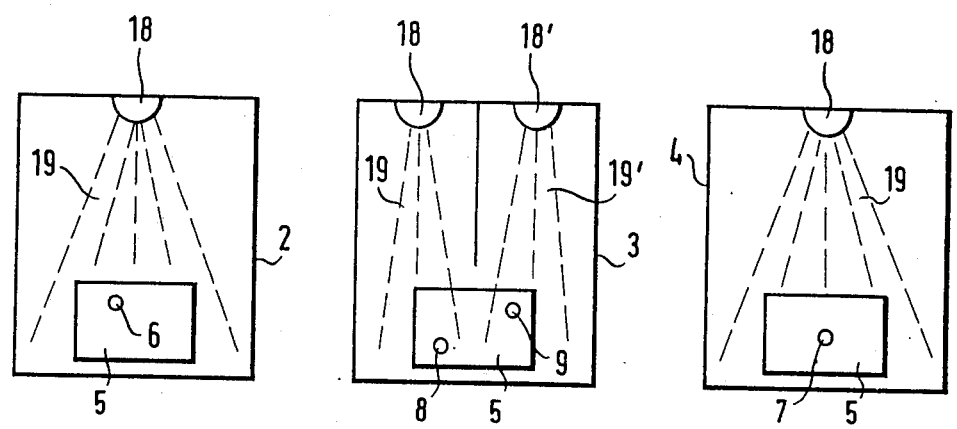
Figure 1:
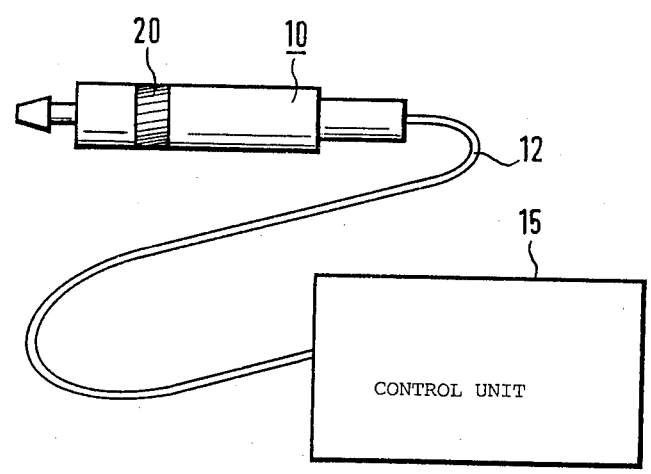

Referring to FIG. 1, shown therein are three assembly locations 2, 3 and 4 in each of which is disposed a respective workpiece 5 as diagramatically indicated by a rectangle. In the case of the assembly stations 2 and 4, a respective assembly task is to be carried out on the workpiece 5 at assembly locations indicated at 6 and 7 respectively, while in the case of the assembly station 3, two different assembly tasks are to be carried out on the workpiece 5 at the two assembly locations 8 and 9 thereon; for example, a screw which previously has been only lightly screwed in is to be tightened at each of the assembly locations. The above-indicated assembly tasks are all different from each other, which is also expressed in FIG. 1 by the fact that the respective assembly locations 6, 7, 8 and 9 which are each represented by means of a circle and which each comprise for example a screwthreaded hole into which the screw to be fitted is to be tightened, are disposed in each assembly station 2, 3 and 4 at a respectively different location on the workpiece 5. However the crucial difference between the assembly tasks which are assumed to be carried out in this situation lies not just in the different geometrical arrangement of the assembly locations 6, 7, 8 and 9 but in particular in the fact that the screws at the various assembly locations are to be tightened using different assembly parameters. For example, the screw which is to be tightened in the assembly station 2 at the assembly location 6 is to be tightened with a torque of 1.5 mkg±5%, the screws which are to be tightened in the assembly station 3 at the assembly locations 8 and 9 are to be tightened with a torque of 2 mkg±5% and a torque of 2 mkg±10% respectively, and the screw which is to be tightened in the assembly station 4 at the assembly location 7 is to be tightened with a torque of 1.0 mkg±10%.

All those various assembly operations are to be carried out with one and the same tool 10 which in the present case is formed by a screw driver which is driven for example by compressed air (the motor drive for that purpose is not shown) but which otherwise can be actuated by hand. On the one hand, the tool 10 can be controlled by a control unit 15 to which it is connected by way of a cable 12, in such a way that a different reference value can be attained with the tool in respect of at least one assembly parameter, if appropriate in each individual assembly operation, while on the other hand fitted into the tool 10 are sensors which are not shown in FIG. 1, for measuring the respective assembly parameter or parameters involved, being in this case the tightening torque for the screws which are to be screwed in.

Those measurement values which constitute actual values are transmitted from the tool 10 to the control unit 15, also by way of the cable 12; for each individual assembly operation, the control unit 15 compares the actual values supplied in that manner to the corresponding reference values and checks whether any deviations which may occur are within presettable tolerance limits.

Since, as indicated above, the respective actual values to be attained and/or the tolerance limits which are admissible in respect of deviations between the actual values and the reference values are different from each other in regard to the various assembly locations 6, 7, 8 and 9, it is necessary for the control unit 15, for each individual assembly operation, to receive information identifying the assembly locations 6, 7, 8 or 9 at which the respective assembly operation is being carried out. For that purpose, each of the assembly stations 2 and 4 is provided with a transmitter 18 emitting a signal into a spatial area 19 which is restricted to the direct vicinity of the respective workpiece 5 at which the assembly operation is to be carried out. That signal contains information which clearly identifies the respective assembly location 6 or 7 in question.

In order to be able to receive the above-mentioned signal and the information contained therein, the tool has a receiver 20 which is of such a design that, irrespective of the respective instantaneous position of the tool 10, it can always reliably receive the signal from the transmitter 18, when the assembly tool 10 is immersed in the 'shower of information' from the transmitter 18, for carrying out the respective assembly operation in question.

As two different assembly tasks have to be carried out in the assembly station 3 at two assembly locations 8 and 9, provided at the assembly station 3 are two transmitters 18 and 18', each of which emits a different signal into a spatial area 19 and 19' which is so screened or shielded from the spatial area 19' and 19 of the adjacent transmitter that the receiver 20 at the tool 10 only ever receives one of the two signals when it passes into the respective spatial area 19 or 19'. That means that in this case also the control unit 15 only ever receives a unique identification signal which indicates whether an assembly operation is being carried out at the assembly location 8 or at the assembly location 9. In that way the operator can also carry out in any sequence the assembly operations which are to be performed at the assembly station 3. In accordance with the invention the number of assembly locations which are provided within an assembly station and at which assembly operations can be carried out in any sequence may also be more than two. For that purpose it is only necessary to provide a correspondingly large number of tranmsitters and to arrange the transmitters at the assembly station in such a way that the spatial areas which are covered by the transmitters do not overlap each other and that, when the tool 10 is moved by the operator to the respective assembly location in question, at least the receiver 20 of the tool is certain to move into the spatial area associated with the respective assembly location.

The signal which is received by the receiver 20 as the tool 10 approaches, when it passes into one of the spatial areas 19, 19', is also passed to the control unit 15 by way of the cable 12, constituting a recognition signal. The information contained in the signal is either already decoded in the tool 10 or it is decoded in the control unit 15 and used by the control unit 15 to call up from a memory or storage means the reference value or values and/or tolerance limits which are preset in respect of the corresponding assembly location 6, 7, 8 or 9, and to make such reference values and/or tolerance limits available for controlling the tool and for comparison with the actual values delivered by the tool 10 in carrying out the respective assembly operation in question.

Figure 2:
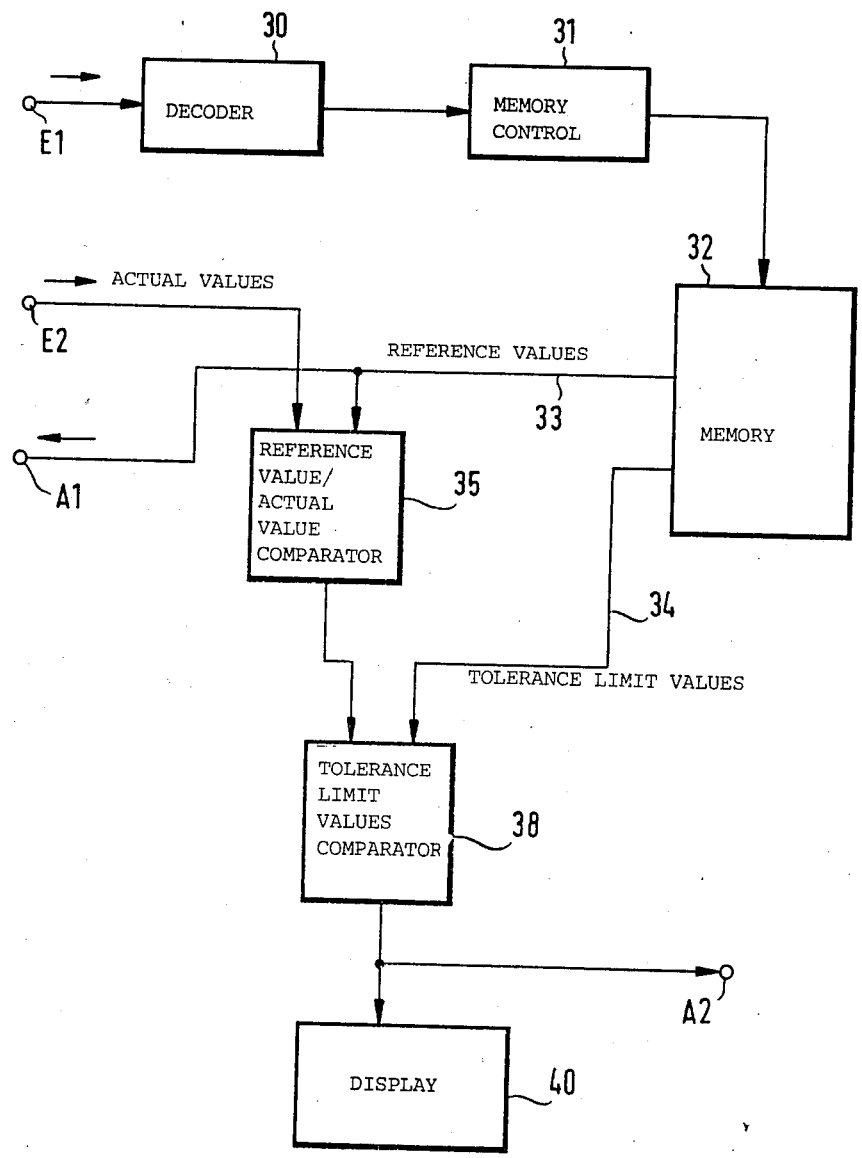

For the purposes of carrying out the above-described procedures, the control unit 15 may include for example the circuit arrangements shown diagrammatically in FIG. 2. It is assumed that the recognition signal is supplied to the control unit 15 by way of an input E1. From there, the signal goes to a decoder 30 which decodes the information which is contained in the recognition signal and which identifies the instantaneous operating assembly location 6, 7, 8 or 9, the decoder 30 passing a corresponding information signal to a memory control means 31 which thereupon actuates a memory or storage means 32 in such a way that it provides the reference value or values required for the respective assembly location, on a reference value output line 33, and the tolerance limit values which are required for the purposes of evaluating deviations of the actual values from the reference values, on its tolerance limit output line 34.

The reference value output line 33 of the memory 32 is connected on the one hand to an output A1 which goes to the tool 10 and on the other hand to the one input of a reference value/actual value comparator 35 whose other input receives the actual values arriving from the tool 10 by way of the input E2 of the control unit 15. The reference value signal which is outputted by way of the output A1 serves to control the tool in such a way that in the next assembly operation the preset reference value or values can be attained. The circuit units which are possibly required for converting the reference value signal into a corresponding control signal and/or for power amplification purposes are not shown in FIG. 2 for the sake of simplicity. They may be arranged both in the tool 10 and in the control unit 15, or distributed between the two.

At its output the comparator 35 generates a difference signal which reproduces the magnitude of the deviation of the actual values from the preset reference values, as well as the sign of that deviation. The difference signal is applied to the one input of a tolerance limit comparator 38 whose other input is connected to the tolerance limit output line 34 of the memory 32.

The tolerance limit comparator 38 compares the difference signal to the tolerance limits and at its output produces a 'good/not good' signal which on the one hand is passed to a display unit 40 and which on the other hand is passed on for further processing by way of an output of the control unit 15. Such further processing may involve for example the respective workpiece 5 being passed to an adjustment station if the above-mentioned signal is of the 'not good' value.

As the memory 32 contains the reference values and tolerance limits in respect of all assembly operations which are to be carried out at the various assembly locations 6, 7, 8 and 9, and as such reference values and tolerance limits can be called up at any time, the above-described arrangement provides at any time the values required for a specific assembly operation. As the control and monitoring system according to the invention automatically identifies the operating assembly location, that is to say that assembly location 6, 7, 8 or 9 at which the tool 10 is being used at the time, the control unit 15 can always select the correct reference values and tolerance limits without the operator of the tool 10 having to be aware of those values and having to introduce them into the control and monitoring system. The only requirement for the control and monitoring system to operate satisfactorily is that the same assembly operation is always carried out at each of the assembly locations 6, 7, 8 or 9. In that connection, the important consideration is not the precise geometrical position of the assembly location on the workpiece 5, but only the fact that the assembly location is within the spatial area 19, 19' covered by the associated transmitter 18, 18' and that the assembly parameters (reference values and tolerance limits) at one and the same assembly location are always identical.

It will be appreciated that the number of assembly stations or assembly locations at which the control and monitoring system according to the invention can be used is not limited to the number shown in FIG. 1. Transmission of the recognition signal and the measured actual values from the 'intelligent' tool 10 to the control unit 15 may also be effected by wireless means, instead of by way of a cable. In addition, it is also possible for a plurality of control units 15 of different tools 10 to be combined together to provide a central control station which can have a memory common for all the tools, for the referenece values and tolerance limits.

I claim:

1. A control and monitoring arrangement for tools which are adapted to be randomly used at different assembly locations, at each of which at least one specific assembly operation is to be performed with the aid of at least one of said tools, at different assembly locations the assembly operations which are to be performed by means of one and the same tool being different from each other with respect to a predeterminable reference value for at least one assembly parameter and/or with respect to predeterminable tolerance limits within which an actually obtained value of said at least one assembly parameter must coincide with said predeterminable reference value, said tools being adapted to measure for each carried out assembly operation the actually obtained value of said at least one assembly parameter and to transmit this measured value to a respective control unit which receives said measured value and checks whether said measured value coincides with a reference value predetermined with respect to said assembly operation within tolerance limits also predetermined with respect to said assembly operation, wherein said control and monitoring arrangement comprises a recognition means comprising for each of said assembly locations at least one transmitter which is fixedly mounted at the respective assembly location so that it emits into a limited spatial area at said assembly location a specific recognition signal which is different from the recognition signals emitted by other transmitters of the arrangement, thereby identifying the pertinent spatial area and for each of said tools a receiver which is attached to the pertinent tool and which is adapted to receive the respective recognition signal when the pertinent tool is moved into one of said spatial areas, said receiver transmitting the received recognition signal to said control unit where it is used for identifying the spatial area in which the respective tool is to be used, so that the control unit can select the pertinent reference value for the at least one assembly parameter and the pertinent tolerance limits of the assembly operation to be done in said spatial area.

2. A control and monitoring arrangement for tools which are adapted to be randomly used at different assembly locations, at each of which at least one specific assembly operation is to be performed with the aid of at least one of said tools, at different assembly locations the assembly operations which are to be performed by means of one and the same tool being different from each other with respect to a predeterminable reference value for at least one assembly parameter and/or with respect to predeterminable tolerance limits within which an actually obtained value of said at least one assembly parameter must coincide with said predeterminable reference value, said tools being adapted to measure for each carried out assembly operation the actually obtained value of said at least one assembly parameter and to transmit this measured value to a respective control unit which receives said measured value and checks whether said measured value coincides with a reference value predetermined with respect to said assembly operation within tolerance limits also predetermined with respect to said assembly operation, wherein said control and monitoring arrangement comprises a recognition means comprising for each of said tools a transmitter which is attached to said tool and which emits a specific recognition signal which is different from the recognition signals emitted by other transmitters attached to tools of the arrangement, thereby identifying the pertinent tool, and for each of said assembly locations at least one receiver which is fixedly mounted at the respective assembly location so that it is adapted to receive a recognition signal from a limited spatial area when any of said tools is moved into said spatial area, said receiver transmitting the received recognition signal to said control unit where it is used for identifying the spatial area in which the respective tool is to be used, so that the control unit can select the pertinent reference value for the at least one assembly parameter and the pertinent tolerance limits of the assembly operation to be done in said spatial area.

3. An arrangement according to claim 2, wherein for each assembly location the recognition means includes a detector which identifies a tool passing into the spatial area of the assembly location, and passes on a signal identifying the tool, to the control unit.

4. A monitoring arrangement according to claim 1 or 2, wherein the transmitter emits a carrier signal onto which said recognition signal is modulated, and wherein the output signal of the receiver is fed to a demodulator for regaining said recognition signal.

5. A monitoring arrangement according to claim 1 or 2, wherein said measured values of the at least one assembly parameter are transmitted to the control unit in a wireless mode.

6. A monitoring arrangement according to claim 1 or 2, wherein the recognition signal is transmitted to the control unit in a wireless mode.

7. A monitoring arrangement according to claim 1 or 2, wherein the control units of a plurality of tools are combined together to provide a central control station which receives and evaluates the recognition signals and the measured values of the assembly parameters from the tools.

* * * * *